United States Patent
Rapoport et al.

(10) Patent No.: US 9,971,698 B2
(45) Date of Patent: May 15, 2018

(54) USING ACCESS-FREQUENCY HIERARCHY FOR SELECTION OF EVICTION DESTINATION

(71) Applicant: Strato Scale Ltd., Herzlia (IL)

(72) Inventors: Mike Rapoport, Haifa (IL); Abel Gordon, Haifa (IL); Ariel Maislos, Bnei Zion (IL)

(73) Assignee: Strato Scale Ltd., Herzlia (IL)

( * ) Notice: Subject to any disclaimer, the term of this patent is extended or adjusted under 35 U.S.C. 154(b) by 122 days.

(21) Appl. No.: 15/017,687

(22) Filed: Feb. 8, 2016

(65) Prior Publication Data
US 2016/0253265 A1    Sep. 1, 2016

Related U.S. Application Data

(63) Continuation of application No. PCT/IB2016/050396, filed on Jan. 27, 2016.
(Continued)

(51) Int. Cl.
*G06F 12/08*       (2016.01)
*G06F 12/0891*     (2016.01)
*G06F 3/06*        (2006.01)

(52) U.S. Cl.
CPC .......... *G06F 12/0891* (2013.01); *G06F 3/061* (2013.01); *G06F 3/0604* (2013.01);
(Continued)

(58) Field of Classification Search
CPC ........... G06F 12/0891; G06F 2212/604; G06F 3/0604; G06F 3/0631; G06F 3/0673;
(Continued)

(56) References Cited

U.S. PATENT DOCUMENTS

| | | |
|---|---|---|
| 5,159,667 A | 10/1992 | Borrey et al. |
| 6,148,377 A | 11/2000 | Carter et al. |

(Continued)

FOREIGN PATENT DOCUMENTS

WO    2009033074 A2    3/2007

OTHER PUBLICATIONS

Roussev, V., "Data Fingerprinting with Similarity Digests", Advances in Digital Forensics VI, Chapter 8, IFIP Advances in Information and Communication Technology, vol. 337, 20 pages, 2010.

(Continued)

*Primary Examiner* — Hashem Farrokh
(74) *Attorney, Agent, or Firm* — D. Kligler IP Services LTD.

(57) ABSTRACT

A method includes, in a computing system in which one or more workloads access memory pages in a memory, defining multiple memory-page lists, and specifying for each memory-page list a respective different scanning period. Access frequencies, with which the memory pages are accessed, are estimated continually by periodically checking the memory pages on each memory-page list in accordance with the scanning period specified for that memory-page list, and re-assigning the memory pages to the memory-page lists based on the estimated access frequencies. One or more of the memory pages are evicted from the memory based on a history of assignments of the memory pages to the memory-page lists.

17 Claims, 2 Drawing Sheets

Related U.S. Application Data

(60) Provisional application No. 62/120,931, filed on Feb. 26, 2015.

(52) U.S. Cl.
CPC .......... *G06F 3/0605* (2013.01); *G06F 3/0631* (2013.01); *G06F 3/0649* (2013.01); *G06F 3/0673* (2013.01); *G06F 3/0685* (2013.01); *G06F 2212/604* (2013.01)

(58) Field of Classification Search
CPC ...... G06F 3/0605; G06F 3/061; G06F 3/0649; G06F 3/0685
See application file for complete search history.

(56) References Cited

U.S. PATENT DOCUMENTS

| | | |
|---|---|---|
| 6,591,355 B2 | 7/2003 | Schuster et al. |
| 6,823,429 B1 | 11/2004 | Olnowich |
| 6,880,102 B1 | 4/2005 | Bridge |
| 7,162,476 B1 | 1/2007 | Belair et al. |
| 7,421,533 B2 | 9/2008 | Zimmer et al. |
| 7,913,046 B2 | 3/2011 | Kamay et al. |
| 8,082,400 B1 | 12/2011 | Chang et al. |
| 8,266,238 B2 | 9/2012 | Zimmer et al. |
| 8,352,940 B2 | 1/2013 | Pafumi et al. |
| 8,544,004 B2 | 9/2013 | Fultheim et al. |
| 8,656,386 B1 | 2/2014 | Baimetov et al. |
| 8,671,445 B1 | 3/2014 | Wang et al. |
| 8,782,003 B1 | 7/2014 | Patterson |
| 8,818,951 B1 | 8/2014 | Muntz et al. |
| 8,943,260 B2 | 1/2015 | Ben-Yehuda et al. |
| 9,183,035 B2 | 11/2015 | Bacher et al. |
| 9,330,015 B2* | 5/2016 | Baskakov ............ G06F 12/1009 |
| 9,552,435 B2* | 1/2017 | Wu ..................... G06F 17/3089 |
| 9,565,651 B2* | 2/2017 | Julian .................. H04W 68/02 |
| 2002/0143868 A1 | 10/2002 | Challenger et al. |
| 2003/0212869 A1 | 11/2003 | Burkey |
| 2004/0153615 A1 | 8/2004 | Koning et al. |
| 2006/0053139 A1 | 3/2006 | Marzinski et al. |
| 2006/0059242 A1 | 3/2006 | Blackmore et al. |
| 2006/0059282 A1 | 3/2006 | Chaudhary et al. |
| 2006/0143389 A1 | 6/2006 | Killian et al. |
| 2006/0155674 A1 | 7/2006 | Traut et al. |
| 2006/0155946 A1 | 7/2006 | Ji et al. |
| 2006/0184652 A1 | 8/2006 | Teodosiu et al. |
| 2006/0248273 A1 | 11/2006 | Jernigan, IV et al. |
| 2007/0033375 A1 | 2/2007 | Sinclair et al. |
| 2008/0294696 A1 | 11/2008 | Frandzel |
| 2009/0049259 A1 | 2/2009 | Sudhakar et al. |
| 2009/0049271 A1 | 2/2009 | Schneider |
| 2009/0055447 A1 | 2/2009 | Sudhakar et al. |
| 2009/0204636 A1 | 8/2009 | Li et al. |
| 2009/0204718 A1 | 8/2009 | Lawton et al. |
| 2009/0304271 A1 | 12/2009 | Takahashi |
| 2009/0307435 A1 | 12/2009 | Nevarez et al. |
| 2009/0307462 A1 | 12/2009 | Fleming |
| 2010/0017625 A1 | 1/2010 | Johnson et al. |
| 2010/0077013 A1 | 3/2010 | Clements et al. |
| 2010/0211547 A1 | 8/2010 | Kamei et al. |
| 2010/0281208 A1 | 11/2010 | Yang |
| 2011/0055471 A1 | 3/2011 | Thatcher et al. |
| 2011/0066668 A1 | 3/2011 | Guarraci |
| 2011/0072234 A1 | 3/2011 | Chinya et al. |
| 2011/0271070 A1* | 11/2011 | Worthington ....... G06F 12/1009 711/165 |
| 2012/0005207 A1 | 1/2012 | Gulhane et al. |
| 2012/0011504 A1* | 1/2012 | Ahmad .................. G06F 12/08 718/1 |
| 2012/0030406 A1 | 2/2012 | Chang et al. |
| 2012/0124282 A1 | 5/2012 | Frank et al. |
| 2012/0130848 A1 | 5/2012 | Shishido et al. |
| 2012/0131259 A1 | 5/2012 | Baskakov et al. |
| 2012/0158709 A1 | 6/2012 | Gaonkar et al. |
| 2012/0192203 A1 | 7/2012 | Corry et al. |
| 2012/0210042 A1 | 8/2012 | Lim et al. |
| 2012/0233425 A1 | 9/2012 | Yueh |
| 2012/0246386 A1* | 9/2012 | Akutsu .................. G06F 3/061 711/103 |
| 2012/0272238 A1 | 10/2012 | Baron |
| 2012/0317331 A1 | 12/2012 | Broas |
| 2012/0324181 A1 | 12/2012 | Garthwaite |
| 2013/0024645 A1 | 1/2013 | Cheriton et al. |
| 2013/0080408 A1 | 3/2013 | Cashman et al. |
| 2013/0132696 A1 | 5/2013 | Tomida et al. |
| 2013/0179381 A1 | 7/2013 | Kawabata et al. |
| 2013/0212345 A1 | 8/2013 | Nakajima |
| 2013/0249925 A1 | 9/2013 | Ginzburg |
| 2013/0275705 A1 | 10/2013 | Schenfeld et al. |
| 2013/0326109 A1 | 12/2013 | Kivity |
| 2013/0339568 A1 | 12/2013 | Corrie |
| 2014/0114932 A1 | 4/2014 | Mallaiah et al. |
| 2014/0115252 A1 | 4/2014 | Yu |
| 2014/0244952 A1 | 8/2014 | Raj et al. |
| 2014/0258655 A1 | 9/2014 | Park et al. |
| 2014/0280664 A1 | 9/2014 | Sengupta et al. |
| 2014/0359244 A1 | 12/2014 | Chambliss et al. |
| 2014/0365708 A1 | 12/2014 | Iwata et al. |
| 2015/0039838 A1 | 2/2015 | Tarasuk-Levin |
| 2015/0089010 A1 | 3/2015 | Tsirkin et al. |
| 2015/0234669 A1 | 8/2015 | Ben-Yehuda et al. |
| 2015/0286414 A1 | 10/2015 | Gordon et al. |
| 2015/0286442 A1 | 10/2015 | Traeger |
| 2015/0288758 A1 | 10/2015 | Zivan |
| 2015/0312366 A1 | 10/2015 | Ben-Yehuda et al. |
| 2016/0110291 A1 | 4/2016 | Gordon et al. |
| 2016/0117103 A1 | 4/2016 | Gallan et al. |
| 2016/0132523 A1 | 5/2016 | Traeger |
| 2016/0378355 A1 | 12/2016 | Muthukkaruppan et al. |
| 2017/0031779 A1 | 2/2017 | Helliker et al. |

OTHER PUBLICATIONS

Lazar et al., U.S. Appl. No. 14/594,188, filed Jan. 12, 2015.
International Application # PCT/IB2014/067327 Search report dated May 20, 2015.
VMware Virtualization, 8 pages, year 2014.
Mitzenmacher et al., "The Power of Two Random Choices: Survey of Techniques and Results", Handbook of Randomized Computing, pp. 255-312, year 2000.
Hudzia et al., "Memory Aggregation for KVM", 41 pages, KVM forum, Nov. 2012.
International Application # PCT/IB2014/067328 Search report dated May 18, 2015.
Hilland et al, RDMA Protocol Verbs Specification, version 1.0, 243 pages, Apr. 2003.
Recio et al, "Remote Direct Memory Access Protocol Specification," RFC 5040, Network Working Group ,57 pages, Oct. 2007.
International Application # PCT/IB2015/050937 Search report dated Jun. 28, 2015.
International Application # PCT/IB2015/052177Search report dated Jul. 19, 2015.
U.S. Appl. No. 14/260,304 Office Action dated May 25, 2016.
International Application PCT/IB2016/050396 Search Report dated Mar. 13, 2016.
International Application PCTIB2015/057235 Search Report dated Dec. 29, 2015.
International Application PCT/IB2015/052179 Search Report dated Sep. 16, 2015.
U.S. Appl. No. 14/333,521 Office Action dated Nov. 27, 2015.
U.S. Appl. No. 14/260,304 Office Action dated Dec. 10, 2015.
U.S. Appl. No. 14/181,791 Office Action dated Feb. 12, 2016.
International Application PCT/IB2015/057658 Search Report dated Jan. 12, 2016.
International Application PCT/IB2015/058841 Search Report dated Feb. 28, 2016.
Amit et al., "VSWAPPER: A Memory Swapper for Virtualized Environments", Proceedings of the 19th International Conference

(56) References Cited

OTHER PUBLICATIONS on Architectural Support for Programming Languages and Operating Systems (AISPLOS'14), pp. 349-366, Salt Lake City, USA, Mar. 1-4, 2014.
Gupta et al., "Difference Engine: Harnessing Memory Redundancy in Virtual Machines", 8th USENIX Symposium on Operating Systems Design and Implementation, pp. 309-322, year 2010.
Heo et al., "Memory overbooking and dynamic control of Xen virtual machines in consolidated environments", Proceedings of the 11th IFIP/IEE International Conference on Symposium on Integrated Network Management, pp. 630-637, year 2009.
Waldspurger., "Memory Resource Management in VMware ESX Server", Proceedings of the 5th Symposium on Operating Systems Design and Implementation, 14 pages, Dec. 9-11, 2002.
Wood et al., "Memory Buddies: Exploiting Page Sharing for Smart Colocation in Virtualized Data Centers", Proceedings of the 2009 ACM SIGPLAN/SIGOPS International Conference on Virtual Execution Environments, pp. 31-40, Washington, USA, Mar. 11-13, 2009.
Gordon et al., "Ginkgo: Automated, Application-Driven Memory Overcommitment for Cloud Computing", ASPLOS's RESoLVE workshop, 6 pages, year 2011.
Zhao et al., "Dynamic memory balancing for virtual machines", Proceedings of the 2009 ACM SIGPLAN/SIGOPS International Conference on Virtual Execution Environments pp. 21-30, Washington, USA, Mar. 11-13, 2009.
Hines et al., "Applications Know Best: Performance-Driven Memory Overcommit with Ginkgo", IEEE 3rd International Conference on Cloud Computing Technology and Science, pp. 130-137, Nov. 29-Dec. 1, 2011.
VMWARE Inc., "Understanding Memory Resource Management in VMware vSphere® 5.0", Technical Paper, 29 pages, year 2011.
U.S. Appl. No. 14/672,466 Office Action dated Sep. 1, 2016.
U.S. Appl. No. 14/543,920 Office Action dated Nov. 18, 2016.
U.S. Appl. No. 14/672,466 Office Action dated Jan. 30, 2017.
U.S. Appl. No. 14/594,188 Office Action dated Apr. 5, 2017.
U.S. Appl. No. 14/181,791 office action dated Jun. 28, 2017.
European Application # 14882215.8 Search Report dated Aug. 1, 2017.
Newhall et al., "Reliable Adaptable Network RAM", IEEE International Conference on Cluster Computing, pp. 2-12, Sep. 29, 2008.
Newhall et al., "Nswap: A Network Swapping Module for Linux Clusters", European Conference on Parallel Processing, Part of the Lecture Notes in Computer Science book series (LNCS, vol. 2790), pp. 1160-1169, May 29, 2004.
Dramitinos et al., "Adaptive and Reliable Paging to Remote Main Memory", Journal of Parallel and Distributed Computing, vol. 58, Issue 3, pp. 357-388, Sep. 1, 1999.
Deshpande et al., "MemX: Virtualization of Cluster-Wide Memory", 39th IEEE International Conference on Parallel Processing (ICPP), pp. 663-672, Sep. 13, 2010.
U.S. Appl. No. 15/424,912 office action dated Oct. 20, 2017.
European Application # 16754814.8 Search Report dated Oct. 24, 2017.
U.S. Appl. No. 14/538,848 office action dated Oct. 6, 2017.
European Application # 15772850.2 Search Report dated Jan. 5, 2018.

\* cited by examiner

USING ACCESS-FREQUENCY HIERARCHY FOR SELECTION OF EVICTION DESTINATION

CROSS-REFERENCE TO RELATED APPLICATIONS

This application claims the benefit of U.S. Provisional Patent Application 62/120,931, filed Feb. 26, 2015. This application is a continuation of PCT Application PCT/IB2016/050396 filed Jan. 27, 2016. The disclosures of these related applications are incorporated herein by reference.

FIELD OF THE INVENTION

The present invention relates generally to data storage, and particularly to methods and systems for data storage based on usage information.

BACKGROUND OF THE INVENTION

Computing systems that run Virtual Machines (VMs) employ various mechanisms for making efficient use of memory. Some commonly used mechanisms comprise, for example, deduplication and eviction of memory pages to external storage. Some external storage systems comprise multiple tiers, such as Solid State Drives (SSDs) and Hard Disk Drives (HDDs).

SUMMARY OF THE INVENTION

An embodiment of the present invention that is described herein provides a method including, in a computing system in which one or more workloads access memory pages in a memory, defining multiple memory-page lists, and specifying for each memory-page list a respective different scanning period. Access frequencies, with which the memory pages are accessed, are estimated continually by periodically checking the memory pages on each memory-page list in accordance with the scanning period specified for that memory-page list, and re-assigning the memory pages to the memory-page lists based on the estimated access frequencies. One or more of the memory pages are evicted from the memory based on a history of assignments of the memory pages to the memory-page lists.

In some embodiments, checking and re-assigning the memory pages include, in response to identifying that a memory page, which is currently assigned to a first memory-page list having a first scanning period, has been accessed since it was previously checked, re-assigning the memory page to a second memory-page list having a second scanning period larger than the first scanning period.

In some embodiments, checking and re-assigning the memory pages include, in response to identifying that a memory page, which is currently assigned to a first memory-page list having a first scanning period, has not been accessed since it was previously checked, re-assigning the memory page to a second memory-page list having a second scanning period smaller than the first scanning period. In an embodiment, the second scanning period is a smallest scanning period among the specified scanning periods.

In a disclosed embodiment, evicting the memory pages includes evicting a memory page in response to identifying that the memory page is assigned to a memory-page list having a smallest scanning period among the specified scanning periods, and was not accessed for more than a predefined time period.

In some embodiments, evicting the memory pages includes selecting a storage tier for evicting a memory page, from among multiple storage tiers, based on the history of the assignments of the memory page. In an embodiment, selecting the storage tier includes calculating a weighted average of numbers of times that the memory page was assigned to the respective memory-page lists, and selecting the storage tier based on the weighted average. In another embodiment, selecting the storage tier includes applying a mapping that chooses the storage tier as a function of the history of the assignments, and the method further includes evaluating a quality of previous selections of the storage tiers, and adapting the mapping based on the evaluated quality.

There is additionally provided, in accordance with an embodiment of the present invention, a computing system including a memory and a processor. The memory is configured for storing memory pages. The processor is configured to run one or more workloads that access the memory pages in the memory, to define multiple memory-page lists and specify for each memory-page list a respective different scanning period, to continually estimate access frequencies with which the memory pages are accessed, by periodically checking the memory pages on each memory-page list in accordance with the scanning period specified for that memory-page list, to re-assign the memory pages to the memory-page lists based on the estimated access frequencies, and to evict one or more of the memory pages from the memory based on a history of assignments of the memory pages to the memory-page lists.

There is further provided, in accordance with an embodiment of the present invention, a computer software product, the product including a tangible non-transitory computer-readable medium in which program instructions are stored, which instructions, when read by a processor that runs one or more workloads that access memory pages in a memory, cause the processor to define multiple memory-page lists, to specify for each memory-page list a respective different scanning period, to continually estimate access frequencies with which the memory pages are accessed, by periodically checking the memory pages on each memory-page list in accordance with the scanning period specified for that memory-page list, to re-assign the memory pages to the memory-page lists based on the estimated access frequencies, and to evict one or more of the memory pages from the memory based on a history of assignments of the memory pages to the memory-page lists.

The present invention will be more fully understood from the following detailed description of the embodiments thereof, taken together with the drawings in which:

DETAILED DESCRIPTION OF EMBODIMENTS

Overview

Figure 1:
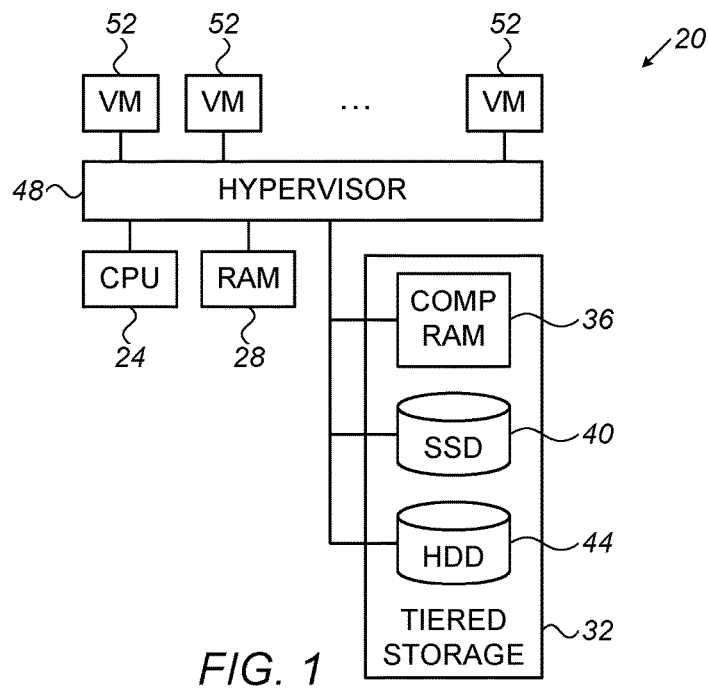
FIG. 1 is a block diagram that schematically illustrates a computing system, in accordance with an embodiment of the present invention.

Many computer systems comprise both volatile memory and non-volatile storage. Typically, the volatile memory is fast to access but has a limited memory space, whereas the non-volatile storage has very large memory space but is slow to access. A good strategy is therefore to retain memory pages that are in frequent use in the volatile memory, and to evict rarely-accessed memory pages to the non-volatile storage. The task of tracking the access frequencies of the various memory pages, however, incurs computational overhead and may cause performance degradation.

Embodiments of the present invention that are described herein provide improved methods and systems for evicting memory pages from volatile memory to alternative storage. The disclosed techniques reduce the computational resources needed for tracking the access frequencies of the memory pages, and the associated performance degradation. By making better eviction decisions, the disclosed techniques also reduce the likelihood of having to reclaim memory pages that have been evicted, thereby further improving performance.

In some embodiments, a computing system runs Virtual Machines (VMs) or other workloads that access memory pages. The system classifies the memory pages accessed by the workloads into multiple lists depending on the currently-known access frequencies of the memory pages.

The system tracks the access frequencies of the memory pages by scanning the lists periodically. In an example implementation, each memory page has an "access bit" that is set to "1" when the page is accessed by a workload, and is reset to "0" when the system scans it in the next scanning period. The system assesses the access frequency of a memory page depending on whether the access bit of the memory page is "0" or "1" when scanned.

In the disclosed embodiments, each list is scanned with a different scanning period. The first list is specified the smallest scanning period, the next list is assigned a larger scanning period, and so on. In scanning the memory pages on a given list, if a memory page is found to have been accessed by a workload since the previous scanning period (e.g., if its access bit is "1"), the system moves the memory page to the next list (which has a larger scanning period). If a memory page was not accessed since the previous scanning period (e.g., its access bit is "0"), the system moves the memory page to the first list (which has a smallest scanning period).

As a result of this process, the first list retains the most-rarely-accessed memory pages, the next list holds more-frequently-accessed memory pages, and so on. The last list holds the most-frequently-accessed memory pages. When using this data structure and process, rarely-accessed memory pages are scanned more often (i.e., with a relatively small scanning period), while frequently-accessed memory pages are scanned less often (i.e., with a relatively large scanning period).

The disclosed scanning process reduces the overall computational resources spent on scanning memory pages, for example because scanning frequently-accessed memory pages is more costly in terms of performance than scanning rarely-accessed memory pages. The disclosed process also reduces disruption to the operation of the VMs due to scanning.

When memory pages are moved between the lists as described above, the history of assignments of a given memory page to the various lists is typically indicative of the access pattern on this memory page by the workloads. In particular, this history is indicative of the likelihood that the memory will be accessed again in the near future.

Thus, in some embodiments the system evicts memory pages from the memory based on a history of assignments of the memory pages to the various lists. The system may track the history of assignments of a memory page, for example, by maintaining multiple counter values that count the number of times that the memory page was assigned to each list.

In some embodiments, the system evicts memory pages to a storage subsystem having multiple storage tiers that differ in access latency. In such embodiments, the system may use the history of assignments, e.g., a weighted average of the counter values, to select the tier to which a memory page is to be evicted. In an embodiment, the system runs an adaptive process that examines the quality of its eviction decisions, and adjusts the weights used in calculating the weighted average accordingly.

System Description

FIG. 1 is a block diagram that schematically illustrates a computing system 20, in accordance with an embodiment of the present invention. In the present example, system 20 comprises a computer such as a personal computer, a server in a data center or other computer cluster, or any other suitable computer.

In the embodiment of FIG. 1, system 20 comprises a Central Processing Unit (CPU) 24, a volatile memory 28 and a tiered storage subsystem 32. CPU 24 is also referred to as a processor. Volatile memory 28 is also referred to as Random Access Memory (RAM) or simply as a memory, and may comprise, for example, one or more Dynamic RAM (DRAM) or Static RAM (SRAM) devices.

Storage subsystem 32 typically comprises multiple types of storage devices referred to as storage tiers. The storage tiers typically differ from one another in factors such as access speed, storage space and cost. In the present example, the first tier comprises one or more RAM devices 36, also referred to as "compressed RAM," in which data is stored in compressed form. (Compressed RAM may be implemented separately from RAM 28, or by storing compressed data in part of the storage space of RAM 28.) The second tier comprises one or more Solid State Drives (SSDs) 40. The third tier comprises one or more Hard Disk Drives (HDDs) 44.

In alternative embodiments, storage subsystem 32 may comprise any other suitable number of storage tiers of any suitable types. For example, an additional storage scheme that can be defined as a separate storage tier is "remote RAM"—Storage in RAM that is located across a communication network, e.g., on a different compute node. Storage in remote RAM may be slower than local RAM, but faster than SSD or HDD. Other examples of possible storage tiers include Storage-Class Memory (SCM) such as XPoint offered by Intel and Micron, or Resistive RAM (ReRAM). SCM may generally positioned as an intermediate tier between RAM and SSD. Yet another example of a possible storage tier is an SSD that uses fast bus interfaces such as NVMe. The possible storage tiers listed above are depicted purely by way of example. The disclosed techniques are in no way limited to any specific configuration of storage tiers.

CPU 24 runs a virtualization layer, which allocates physical resources of system 20 to one or more workloads. In the present example, the virtualization layer comprises a hypervisor 48, and the workloads comprise Virtual Machines (VMs) 52. Physical resources provided to the workloads may comprise, for example, CPU resources, volatile memory (e.g., RAM) resources, storage resources (e.g., resources of storage subsystem 32) and networking resources.

Additionally or alternatively to VMs 52, other types of workloads may comprise, for example, Operating-System containers, processes, applications, or any other suitable workload type. The description that follows refers mainly to VMs for the sake of clarity. The disclosed techniques, however, are applicable in a similar manner to any other type of workload.

As part of their operation, VMs 52 access memory pages, e.g., read and write memory pages. Some of the memory pages may be stored in RAM 28, while other memory pages may be stored in the various storage tiers of storage subsystem 32. Management of the memory pages, and in particular eviction of memory pages from RAM 28 to storage subsystem 32, is performed by hypervisor 48 using methods that are described in detail below.

The configuration of system 20 shown in FIG. 1 is an example configuration that is chosen purely for the sake of conceptual clarity. In alternative embodiments, any other suitable system configuration can be used. The disclosed techniques are typically implemented in software, but may also be implemented in hardware or using a combination of software and hardware elements.

Typically, CPU 24 comprises one or more general-purpose processors, which are programmed in software to carry out the functions described herein. The software or components thereof (e.g., hypervisor 48 or parts thereof, VMs 52 or other workloads, or other software components) may be downloaded to the processors in electronic form, over a network, for example, or it may, alternatively or additionally, be provided and/or stored on non-transitory tangible media, such as magnetic, optical, or electronic memory.

Tracking Memory-Page Access and Making Eviction Decisions Using Multiple Memory-Page Lists Having Different Scan Periods Typically, RAM 28 has a fast access time but limited memory space. Storage subsystem 32, on the other hand, typically has much larger storage space but is slow to access. Thus, in some embodiments hypervisor 48 aims to retain in RAM 28 a relatively small number of memory pages that are in frequent use, and to evict rarely-accessed memory pages to storage subsystem 32.

Hypervisor 48 typically tracks the access frequencies of the various memory pages by running a background process that scans the memory pages in RAM 28 periodically. In an example embodiment, each memory page has an "access bit" that is set to "1" when the page is accessed by a VM 52, and is reset to "0" by the hypervisor when scanning the memory page in the subsequent scanning period. Thus, an access bit of "1" indicates that the memory page was accessed by a VM since it was reset to "0" by the previous scanning period. In the present context, both readout from a memory page and writing to a memory page are regarded as accessing the memory page.

In practice, the task of tracking the access frequencies of the various memory pages in this manner is computationally intensive and may cause performance degradation. In some embodiments, hypervisor 48 reduces the overhead and associated degradation by dividing the memory pages in RAM 28 into multiple lists, depending on the currently-known access frequencies of the memory pages. The hypervisor selects memory pages for eviction by scanning each list with a different scanning period.

Figure 2:
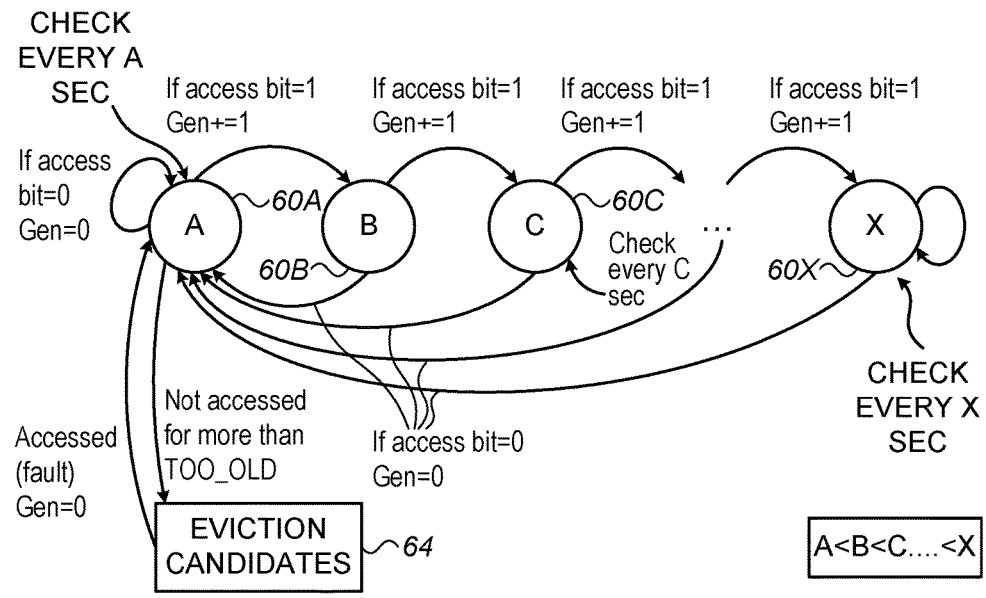
FIG. 2 is a diagram that schematically illustrates a process of selecting candidate memory pages for eviction, in accordance with an embodiment of the present invention.

FIG. 2 is a diagram that schematically illustrates a process of selecting candidate memory pages for eviction, in accordance with an embodiment of the present invention. The figures shows a plurality of lists 60A . . . 60X. The lists are also referred to as "Least-Recently Used (LRU) generations" or simply "generations." Any suitable number of lists can be used. New memory pages are initially assigned to list 60A.

Hypervisor 48 defines respective different, monotonically-increasing scanning periods for the lists. In other words, the hypervisor checks the access bits of the memory pages on list 60A every A seconds, of the memory pages on list 60B every B seconds, of the memory pages on list 60C every C seconds, and so on, wherein A<B<C< . . . <X. In an example embodiment, A=B/2, B=C/2, i.e., the memory pages on each list are visited twice more frequently than the memory pages on the next list.

When scanning the memory pages on a given list, if hypervisor 48 finds a memory page whose access bit is "1", the hypervisor moves this memory page to the next list (the next-higher "generation" that is scanned with a larger scanning period). If hypervisor 48 finds a memory page whose access bit is "0", the hypervisor moves this memory page to list 60A, the lowest "generation" that is scanned with the smallest scanning period. In an alternative embodiment, the hypervisor moves this memory page to a lower list, which is scanned with a smaller scanning period than the given list, but not necessarily all the way to list 60A.

As a result of this process, list 60A (which is scanned most frequently) holds the most-rarely-accessed memory pages. List 60X (which is scanned least frequently) holds the most-frequently-accessed memory pages. Generally, this data structure and scanning process scans each memory page with a scanning period that is inversely-related to the currently-known access frequency of the memory pages.

The actual frequency with which VMs 52 access a certain memory page in RAM 28 may vary over time. A memory page may therefore move from one list to another over time. A memory page may, for example, move to higher generations in response to higher access frequency, fall to the lowest generation when not accessed for a long time period, and later again move to higher generations, and so on.

Thus, the history of assignments of a given memory page to the various lists is typically indicative of the access pattern on this memory page by VMs 52. In particular, the history of assignments to the lists is indicative of the likelihood that the memory will be accessed again in the near future. In some embodiments, hypervisor 48 evicts memory pages from RAM 28 to storage subsystem 32 based on the history of assignments of the memory pages to the various lists 60A . . . 60X.

In an embodiment, hypervisor 48 identifies the memory pages that are assigned to the lowest list (list 60A) and are not accessed for more than a predefined time period (denoted TOO_OLD). The hypervisor marks these memory pages as eviction candidates 64, and subsequently evicts them to storage subsystem 32. If the hypervisor detects that an eviction candidate is accessed by a VM 52, e.g., by detecting a page fault, the memory page is returned to list 60A.

Hypervisor 48 may track the history of assignments of a memory page in various ways. For example, the hypervisor may maintain X counters for each memory page, e.g., as part of the memory-page metadata. The $i^{th}$ counter of a memory page counts the number of times that the memory page was assigned to the $i^{th}$ list. In this embodiment, when moving a memory page from the $m^{th}$ list to the $n^{th}$ list, the hypervisor increments the counter value of the $n^{th}$ list in the memory-page metadata.

In another embodiment, in order to reduce the size of the memory-page metadata, hypervisor 48 retains only a weighted average of the counter values. In this embodiment, each list is assigned a respective weight. When moving a memory page from the $m^{th}$ list to the $n^{th}$ list, the hypervisor increases the weighted average in the memory-page metadata by the weight of the $n^{th}$ list. In an embodiment, higher-generation lists are assigned higher weights, and vice versa.

As such, a memory page that spent most of its life-cycle on the lowest lists will have a relatively small weighted-average value. A memory page that reached higher-order lists often along its life-cycle will have a relatively high weighted-average value. In an embodiment, one or more of the lists (e.g., the lower lists) are assigned negative weights, and one or more other lists (e.g., the higher lists) are assigned positive weights. This scheme reduces memory space since the resulting weighted averages can be stored with a smaller number of bits.

In alternative embodiments, hypervisor 48 may track the history of assignments of a memory page to the various lists in any other suitable way.

As explained above, storage subsystem 32 has multiple storage tiers that differ in access latency from one another. In some embodiments, when preparing to evict a candidate memory page, hypervisor 48 uses the history of assignments of this memory page for selecting the tier to which to evict the candidate memory page. Hypervisor 48 may use various policies or heuristics in making these decisions.

For example, a candidate memory page that spent most of its life-cycle on the lowest lists may be evicted to HDD 44 (which has high access latency), since it is unlikely to be accessed again in the foreseeable future. In contrast, a candidate memory page that often reached higher-order lists may be evicted to compressed RAM 36 or to SSD 40 (which have lower access latency than the HDD), assuming there is higher likelihood it will be accessed in the near future.

In some embodiments, hypervisor 48 selects the storage tier for evicting a candidate memory page based on the weighted average of counter values described above. Candidate memory pages having high average-weight values will typically be evicted to higher tiers (having smaller access latencies) such as compressed RAM 36. Candidate memory pages having low average-weight values will typically be evicted to lower tiers (having larger access latencies) such as HDD 44.

In an example embodiment, hypervisor 48 evicts a memory page to compressed RAM 36 if the weighted average value of this memory page is in a range denoted R1, to SSD 40 if the weighted average value of this memory page is in a range denoted R2, and to HDD 44 if the weighted average value of this memory page is in a range denoted R3. The ranges R1, R2 and R3, and/or the weights used for calculating the weighted averages, can be adjusted adaptively to improve the quality of the hypervisor's eviction decisions.

In the present context, the ranges R1, R2 and R3, and the weights used for calculating the weighted averages, are regarded collectively as a mapping that chooses the storage tier as a function of the history of past assignments of memory pages to memory-page lists. The hypervisor may adapt this mapping over time. An adaptation mechanism of this sort is described further below.

Figure 3:
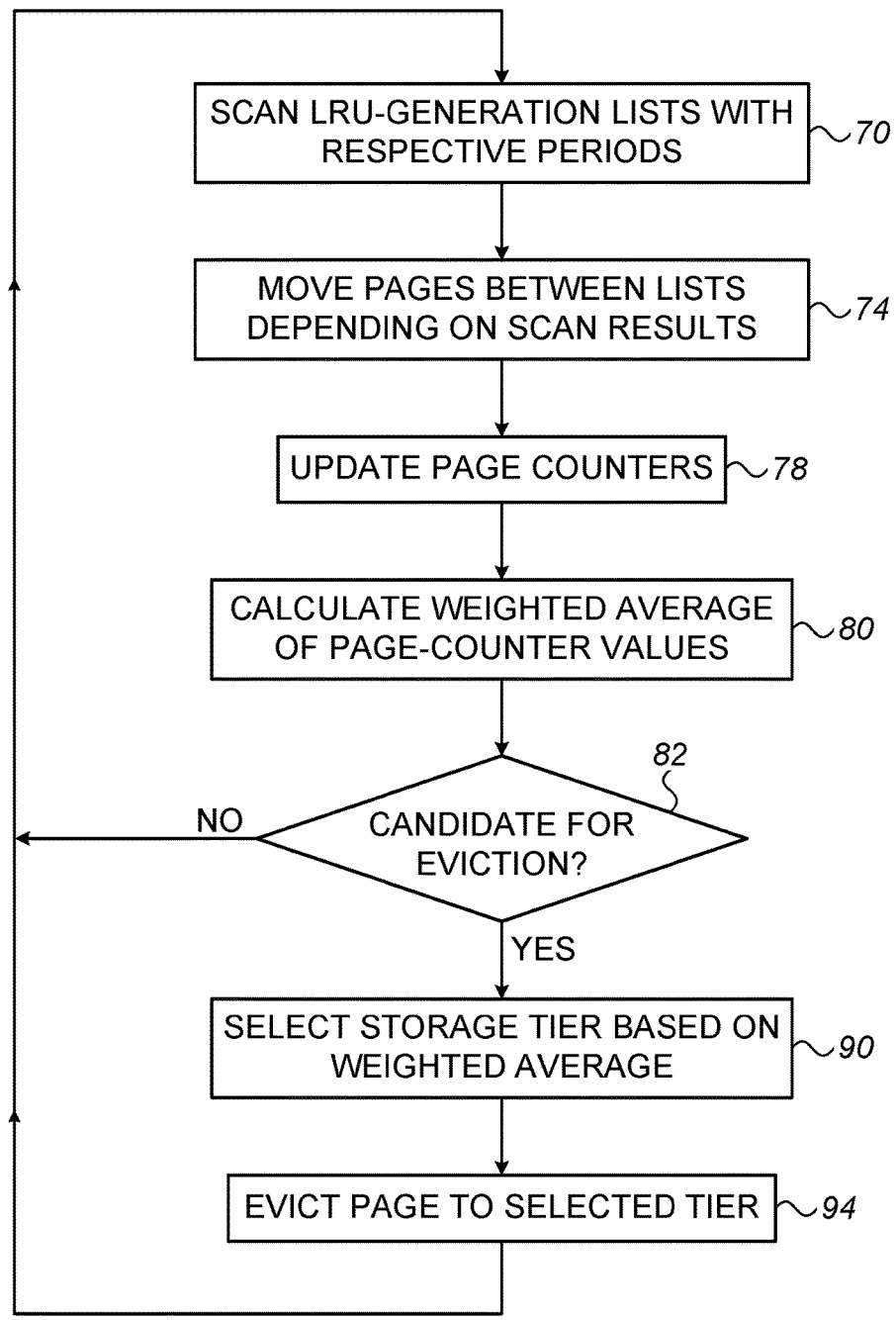
FIG. 3 is a flow chart that schematically illustrates a method for memory-page eviction, in accordance with an embodiment of the present invention.

FIG. 3 is a flow chart that schematically illustrates a method for memory-page eviction, in accordance with an embodiment of the present invention. The method begins with hypervisor 48 scanning lists 60A . . . 60X with the respective different scanning periods specified for the lists, at a scanning step 70. At a page moving step 74, the hypervisor moves memory pages between the lists depending on the access bit values of the memory pages.

At counter updating step 78, the hypervisor updates the counter values of the pages that have been moved. At a weighted average calculation step 80, hypervisor 48 calculates (or updates) the weighted average of the counter values of this memory page.

At an eviction checking step 82, hypervisor 48 checks for candidate memory pages for eviction from RAM 28. For example, the hypervisor may check whether any of the memory pages on list 60A were not accessed for more than the TOO_LONG time threshold. If no memory pages are candidates for eviction, the method loops back to step 70 above.

If a candidate memory page has been found, hypervisor 48 selects a storage tier in storage subsystem 32 to which the memory page is to be evicted, at a tier selection step 90. The hypervisor selects the storage tier based on the weighted average of the counter values of the memory page, as calculated at step 80 above. The hypervisor evicts the candidate memory page to the selected storage tier, at an eviction step 94. Upon eviction, the hypervisor resets the weighted average and the counter values of the memory page to zero. The method then loops back to step 70 above.

In some embodiments, hypervisor 48 runs an adaptive process that examines the quality of previous eviction decisions, and adjusts the weights used in calculating the weighted average and/or the ranges of weighted-average values mapped to the different tiers.

In an example embodiment, hypervisor 48 specifies an "expected time duration range" for each storage tier in subsystem 32. If a memory page, which was evicted to a certain tier of storage subsystem 32, remains in subsystem 32 for a time duration that falls in the expected range for that tier, the eviction decision is considered correct. Otherwise, i.e., if the actual time duration spent in storage is below or above the expected range, the eviction decision is considered wrong.

Consider, for example, the time durations specified in the following table:

| Storage tier | Expected time duration for an evicted memory page to remain in storage tier before being accessed again |
| --- | --- |
| Compressed RAM | T0 < t < T1 |
| SSD | T2 < t < T3 |
| HDD | t > T4 |

In the present example, a memory page evicted to compressed RAM 36 is expected to remain there for at least T0 seconds, but no more than T1 seconds, before the next access to that memory page by a VM 52. If this condition is met, the decision to evict this memory page to compressed RAM is considered correct. If the actual time duration before next access is below T0, it would have been better not to evict the memory page at all. If the actual time duration before next access is above T1, it would have been better to evict the memory page to SSD or HDD.

In a similar manner, a memory page evicted to SSD 40 is expected to remain there for at least T2 seconds, but no more than T3 seconds. If the actual time duration before next access is below T2, it would have been better not to evict the memory page at all or to evict it to compressed RAM. If the actual time duration before next access is above T3, it would have been better to evict the memory page to HDD.

Finally, a memory page evicted to HDD 44 is expected to remain there for at least T4. If the actual time duration before next access is lower than T4, it would have been better to evict the memory page to some higher tier, or not at all. In some embodiments, some overlap may exist between the ranges of adjacent tiers.

In some embodiments, hypervisor 48 counts the number of erroneous eviction decisions, and possibly maintains separate error counts for the different tiers. The hypervisor may adapt the ranges R1, R2 and R3 that map weighted averages to tiers, and/or the weights used for calculating the weighted averages, so as to reduce the error counts. This adaptation improves the quality of the hypervisor's eviction decisions, i.e., increases the likelihood that a memory page will be evicted when appropriate, and to the correct storage tier.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
in a computing system in which one or more workloads access memory pages in a memory, defining multiple memory-page lists, and specifying for each memory-page list a respective different scanning period;
continually estimating access frequencies with which the memory pages are accessed, by periodically checking the memory pages on each memory-page list in accordance with the scanning period specified for that memory-page list, and re-assigning the memory pages to the memory-page lists based on the estimated access frequencies;
selecting one or more memory pages for eviction from the memory to one or more of multiple storage tiers;
selecting for each of the one or more memory pages selected for eviction, a storage tier to which to evict the memory page, from among the multiple storage tiers, based on a history of the assignments of the memory page to the memory page lists; and
evicting the one or more of the memory pages from the memory to the respective selected storage tiers,
wherein selecting for each of the one or more memory pages selected for eviction, a storage tier comprises determining for evicted memory pages an expected time duration before it will be required in the main memory and selecting a storage tier responsively to the expected time duration.

2. The method according to claim 1, wherein checking and re-assigning the memory pages comprise, in response to identifying that a memory page, which is currently assigned to a first memory-page list having a first scanning period, has been accessed since it was previously checked, re-assigning the memory page to a second memory-page list having a second scanning period larger than the first scanning period.

3. The method according to claim 1, wherein checking and re-assigning the memory pages comprise, in response to identifying that a memory page, which is currently assigned to a first memory-page list having a first scanning period, has not been accessed since it was previously checked, re-assigning the memory page to a second memory-page list having a second scanning period smaller than the first scanning period.

4. The method according to claim 3, wherein the second scanning period is a smallest scanning period among the specified scanning periods.

5. The method according to claim 1, wherein evicting the memory pages comprises evicting a memory page in response to identifying that the memory page is assigned to a memory-page list having a smallest scanning period among the specified scanning periods, and was not accessed for more than a predefined time period.

6. The method according to claim 1, wherein selecting the storage tier comprises calculating a weighted average of numbers of times that the memory page was assigned to the respective memory-page lists, and selecting the storage tier based on the weighted average.

7. The method according to claim 1, wherein selecting the storage tier comprises applying a mapping that chooses the storage tier as a function of the history of the assignments, and comprising evaluating a quality of previous selections of the storage tiers, and adapting the mapping based on the evaluated quality.

8. The method according to claim 1, further comprising determining after evicted pages were returned to memory, an actual time duration spent by the evicted page in the selected storage tier, and determining whether the selected storage tier would have been selected for the evicted page if the actual time duration was known.

9. The method according to claim 1, wherein re-assigning the memory pages to the memory-page lists based on the estimated access frequencies comprises assigning rarely-accessed memory pages to lists indicating a more often scanning, while frequently-accessed memory pages are assigned to lists indicating less often scanning.

10. A computing system, comprising:
a memory for storing memory pages; and
a processor, which is configured to run one or more workloads that access the memory pages in the memory, to define multiple memory-page lists and specify for each memory-page list a respective different scanning period, to continually estimate access frequencies with which the memory pages are accessed, by periodically checking the memory pages on each memory-page list in accordance with the scanning period specified for that memory-page list, to re-assign the memory pages to the memory-page lists based on the estimated access frequencies, to select one or more memory pages for eviction from the memory to one or more of multiple storage tiers, and to evict the one or more of the memory pages from the memory based on a history of assignments of the memory pages to the memory-page lists,
wherein the processor is configured to select for each of the one or more memory pages selected for eviction, a storage tier for evicting the memory page, from among the multiple storage tiers, based on the history of the assignments of the memory page to the memory page lists, wherein selecting for each of the one or more memory pages selected for eviction, a storage tier comprises determining for evicted memory pages an expected time duration before it will be required in the main memory and selecting a storage tier responsively to the expected time duration.

11. The computing system according to claim 10, wherein, in response to identifying that a memory page, which is currently assigned to a first memory-page list having a first scanning period, has been accessed since it was previously checked, the processor is configured to re-assign the memory page to a second memory-page list having a second scanning period larger than the first scanning period.

12. The computing system according to claim 10, wherein, in response to identifying that a memory page, which is currently assigned to a first memory-page list having a first scanning period, has not been accessed since it was previously checked, the processor is configured to re-assign the memory page to a second memory-page list having a second scanning period smaller than the first scanning period.

13. The computing system according to claim 12, wherein the second scanning period is a smallest scanning period among the specified scanning periods.

14. The computing system according to claim 10, wherein the processor is configured to evict a memory page in response to identifying that the memory page is assigned to a memory-page list having a smallest scanning period among the specified scanning periods, and was not accessed for more than a predefined time period.

15. The computing system according to claim 10, wherein the processor is configured to calculate a weighted average of numbers of times that the memory page was assigned to the respective memory-page lists, and to select the storage tier based on the weighted average.

16. The computing system according to claim 10, wherein the processor is configured to select the storage tier by applying a mapping that chooses the storage tier as a function of the history of the assignments, to evaluate a quality of previous selections of the storage tiers, and to adapt the mapping based on the evaluated quality.

17. A computer software product, the product comprising a tangible non-transitory computer-readable medium in which program instructions are stored, which instructions, when read by a processor that runs one or more workloads that access memory pages in a memory, cause the processor to define multiple memory-page lists, to specify for each memory-page list a respective different scanning period, to continually estimate access frequencies with which the memory pages are accessed, by periodically checking the memory pages on each memory-page list in accordance with the scanning period specified for that memory-page list, to re-assign the memory pages to the memory-page lists based on the estimated access frequencies, to select one or more memory pages for eviction from the memory to one or more of multiple storage tiers, to select for each of the one or more memory pages selected for eviction, a storage tier to which to evict the memory page, from among the multiple storage tiers, based on a history of the assignments of the memory page to the memory page lists, and to evict the one or more of the memory pages from the memory to the respective selected storage tiers, wherein selecting for each of the one or more memory pages selected for eviction, a storage tier comprises determining for evicted memory pages an expected time duration before it will be required in the main memory and selecting a storage tier responsively to the expected time duration.

* * * * *